US012491438B2

(12) United States Patent
Chen et al.

(10) Patent No.: US 12,491,438 B2
(45) Date of Patent: Dec. 9, 2025

(54) CONTROL METHOD AND APPARATUS OF VIRTUAL SKILL, DEVICE, STORAGE MEDIUM AND PROGRAM PRODUCT

(71) Applicant: Tencent Technology (Shenzhen) Company Limited, Shenzhen (CN)

(72) Inventors: Xiaofeng Chen, Shenzhen (CN); Fan Dong, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 263 days.

(21) Appl. No.: 18/204,868

(22) Filed: Jun. 1, 2023

(65) Prior Publication Data

US 2023/0321543 A1 Oct. 12, 2023

Related U.S. Application Data

(63) Continuation of application No. PCT/CN2022/101493, filed on Jun. 27, 2022.

(30) Foreign Application Priority Data

Aug. 16, 2021 (CN) ......................... 202110937321.4

(51) Int. Cl.
*A63F 13/55* (2014.01)
*A63F 13/42* (2014.01)

(52) U.S. Cl.
CPC .............. *A63F 13/55* (2014.09); *A63F 13/42* (2014.09); *A63F 2300/1075* (2013.01); *A63F 2300/308* (2013.01)

(58) Field of Classification Search
CPC .......... A63F 13/55; A63F 13/42; A63F 13/56; A63F 2300/1075; A63F 2300/308
See application file for complete search history.

(56) References Cited

U.S. PATENT DOCUMENTS

2009/0104990 A1 4/2009 Tsujino et al.
2013/0038623 A1* 2/2013 Tezuka .................... A63F 13/42 345/589

(Continued)

FOREIGN PATENT DOCUMENTS

CN 105446525 A 3/2016
CN 109364476 A 2/2019

(Continued)

OTHER PUBLICATIONS

Tencent Technology, ISR, PCT/CN2022/101493, Sep. 27, 2022, 2 pgs.

(Continued)

*Primary Examiner* — James S. McClellan
(74) *Attorney, Agent, or Firm* — Morgan, Lewis & Bockius LLP

(57) ABSTRACT

This application provides a control method of a virtual skill performed by an electronic device. The method includes: rendering a skill control of a virtual scene, the skill control corresponding to a motion skill of a target virtual object; rendering a composite skill control containing a direction indication identification when a trigger operation for the skill control is received; and controlling the target virtual object to release the motion skill along a first direction according to a current property of the direction indication identification in the composite skill control in response to a first skill release instruction triggered on the composite skill control.

20 Claims, 9 Drawing Sheets

(56) References Cited

U.S. PATENT DOCUMENTS

| | | | | |
|---|---|---|---|---|
| 2014/0066195 | A1* | 3/2014 | Matsui | A63F 13/533 463/30 |
| 2014/0274242 | A1 | 9/2014 | Haswell | |
| 2018/0043260 | A1* | 2/2018 | Tang | A63F 13/822 |
| 2018/0369693 | A1* | 12/2018 | Rong | A63F 13/92 |
| 2018/0373376 | A1* | 12/2018 | Kurabayashi | A63F 13/218 |
| 2019/0265882 | A1* | 8/2019 | Nakahara | G06F 3/04845 |
| 2021/0101074 | A1* | 4/2021 | Hemby | A63F 13/2145 |

FOREIGN PATENT DOCUMENTS

| | | | |
|---|---|---|---|
| CN | 110955370 | A | 4/2020 |
| CN | 111905371 | A | 11/2020 |
| CN | 112402949 | A | 2/2021 |
| CN | 112791410 | A | 5/2021 |
| CN | 113244608 | A | 8/2021 |
| CN | 113633964 | A | 12/2021 |
| EP | 2487575 | A2 | 8/2012 |
| JP | 2009056181 | A | 3/2009 |
| JP | 2012168931 | A | 9/2012 |
| JP | 2016129579 | A | 7/2016 |
| JP | 2017191436 | A | 10/2017 |
| JP | 2018075225 | A | 5/2018 |
| JP | 6521146 | B1 | 5/2019 |
| JP | 2019201851 | A | 11/2019 |

OTHER PUBLICATIONS

Xun Cat, “Glory of the King: The King’s Hand Speed is 1 Second and 5 Times, the Strongest and Most “Sexy” Zhuge Teaching!”, Apr. 27, 2019, 1 pg., Retrieved from the Internet: https://haokan.baidu.com/v?vid=498667786398358344.

Tencent Technology, WO, PCT/CN2022/101493, Sep. 27, 2022, 5 pgs.

Tencent Technology, IPRP, PCT/CN2022/101493, Feb. 13, 2024, 6 pgs.

Tencent Technology, Japanese Office Action, JP Patent Application No. 2023-551789, Nov. 12, 2024, 6 pgs.

Tencent Technology, Japanese Office Action, JP Patent Application No. 2023-551789, Jul. 17, 2024, 8 pgs.

* cited by examiner

CONTROL METHOD AND APPARATUS OF VIRTUAL SKILL, DEVICE, STORAGE MEDIUM AND PROGRAM PRODUCT

CROSS-REFERENCE TO RELATED APPLICATIONS

This application is a continuation application of PCT Patent Application No. PCT/CN2022/101493, entitled "CONTROL METHOD AND APPARATUS OF VIRTUAL SKILL, DEVICE, STORAGE MEDIUM AND PROGRAM PRODUCT" filed on Jun. 27, 2022, which claims priority to Chinese Patent Application No. 202110937321.4 filed on Aug. 16, 2021, all of which is incorporated herein by reference in its entirety.

FIELD OF THE TECHNOLOGY

This application relates to the computer technologies and human-computer interaction technologies, and in particular, to a control method and apparatus of a virtual skill, an electronic device, a computer readable storage medium, and a computer program product.

BACKGROUND OF THE DISCLOSURE

In most virtual scene applications involving a motion skill, during the release of the motion skill, related technologies often need to click a skill button corresponding to the motion skill to control a character to move by a certain distance along its own direction, and change the motion direction of the character by controlling a movement of a lens. This method requires a cooperation of a plurality of buttons to release the motion skill along a specified direction. The operation is cumbersome and inefficient, and the efficiency of human-computer interaction is low. Moreover, in the game process, a user often needs to control a virtual object for the release of the motion skill many times, while the switching of a plurality of buttons brought by each skill release increases the data processing burden of an electronic device and makes the utilization of hardware resources low.

SUMMARY

Embodiments of this application provide a control method and apparatus of a virtual skill, a device, and a non-transitory computer readable storage medium, capable of improving the release efficiency of motion skills in a specified direction, the efficiency of human-computer interaction and the utilization of hardware resources.

The technical solution of the embodiments of this application is realized as follows:

Embodiments of this application provide a control method of a virtual skill performed by an electronic device, the method including:

- rendering a skill control of a virtual scene, the skill control corresponding to a motion skill of a target virtual object;
- rendering a composite skill control containing a direction indication identification when a trigger operation for the skill control is received; and
- controlling the target virtual object to release the motion skill along a first direction according to a current property of the direction indication identification in the composite skill control in response to a first skill release instruction triggered on the composite skill control.

Embodiments of this application provide an electronic device, including:

- a memory, configured to store an executable instruction; and
- a processor, configured to execute the executable instruction stored in the memory to implement the control method of a virtual skill provided by the embodiments of this application.

Embodiments of this application provide a non-transitory computer readable storage medium having an executable instruction stored thereon, when executed by a processor, implementing the control method of a virtual skill provided by the embodiments of this application.

Embodiments of this application provide a computer program product, including a computer program or an instruction, when executed by a processor, implementing the control method of a virtual skill provided by the embodiments of this application.

The embodiments of this application have the following beneficial effects:

By triggering the skill control corresponding to the motion skill, the rendered skill control is switched to the composite skill control. In response to the first direction adjustment instruction triggered on the composite skill control, the property of the direction indication identification in the composite skill control is changed. That is, the first direction adjustment instruction for direction adjustment of user-triggered instructions responds to changes in the property of the direction indication identification in the composite skill control, and in other words, the adjustment of the indication direction is changed by the property. When the first skill release instruction triggered on the composite skill control, the target virtual object is controlled to release the motion skill along the first direction, that is, the motion skill is released along the adjusted direction. In this way, through a composite skill control, the adjustment of the motion direction of the target virtual object and the release of the motion skills in a specified direction may be realized. This operation is simple, and improves the release efficiency of the motion skill in the specified direction, the efficiency of human-computer interaction and the utilization of hardware resources. Moreover, the adaptability in the fast-paced virtual scene and the user's operating experience are improved.

DESCRIPTION OF EMBODIMENTS

Figure 1:
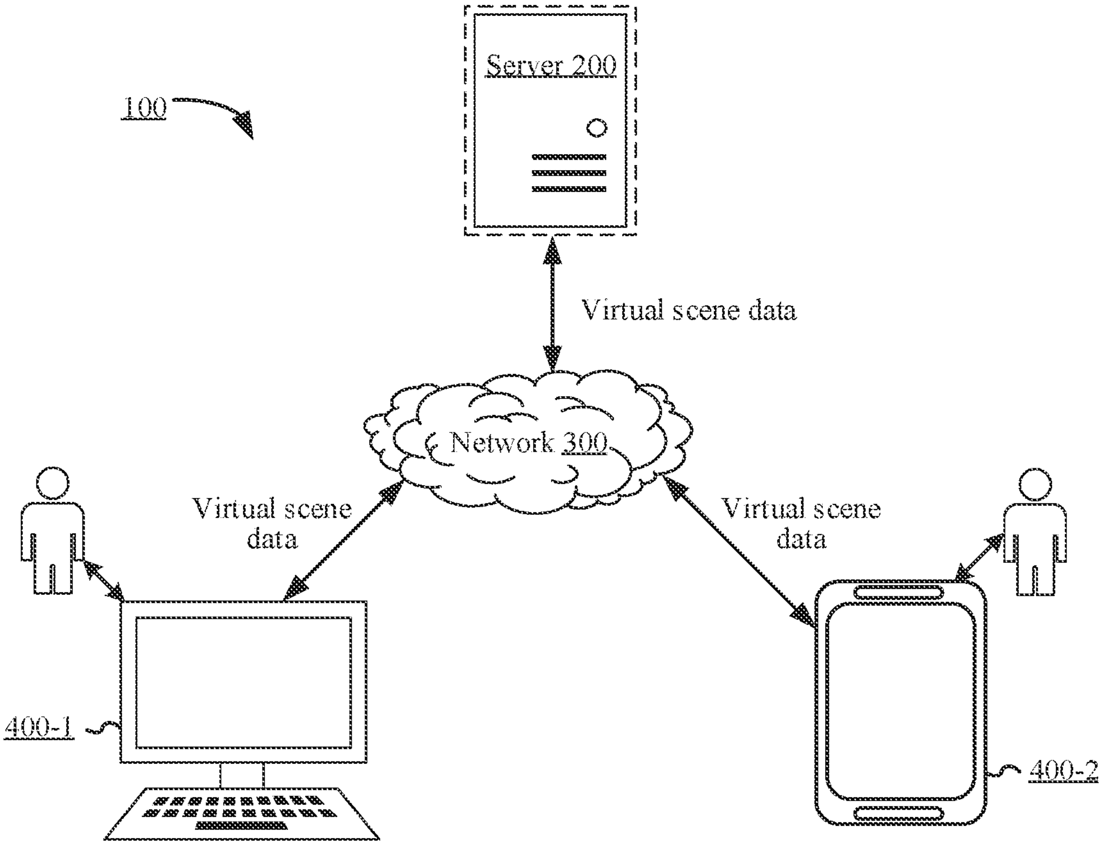
FIG. 1 is a schematic architecture diagram of a control system 100 of a virtual skill according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, “some embodiments” are involved, which describe a subset of all possible embodiments, but it is understandable that “some embodiments” may be the same subset or different subset of all possible embodiments, and may be combined with each other without conflict.

In the following description, the term “first/second . . . ” involved is only used for distinguishing similar objects and does not represent a specific order of objects. Understandably. “first/second . . . ” may be interchanged with a specific order or priority if permitted, so that embodiments of this application described here may be implemented in an order other than that illustrated or described here.

Unless otherwise defined, meanings of all technical and scientific terms used in this specification are the same as those usually understood by a person skilled in the art to which this application belongs. The terms used herein are only used for describing the purpose of embodiments of this application, not intended to limit this application.

Before the embodiments of this application are further described in detail, a description is made on nouns and terms in the embodiments of this application, and the nouns and terms in the embodiments of this application are applicable to the following explanations.

1) Client, an application running in the terminal for providing a plurality of services, such as a video playback client and a game client.
2) In response to, used for representing conditions or states on which the executed operation relies. If the conditions or states are satisfied, one or more executed operations may be real-time or have a set delay. without a special explanation, there is no limit on the order of execution of the plurality of operations.
3) Virtual scene, a virtual scene that the application displays (or provides) when running on the terminal. The virtual scene may be a simulation environment for the real world, a semi-simulation and semi-fiction virtual environment, or a pure virtual environment. The virtual scene may be any one of a two-dimensional virtual scene, 2.5-dimensional virtual scene, or three-dimensional virtual scene. Embodiments of this application do not limit the dimension of the virtual scene.

For example, when the virtual scene is a three-dimensional virtual space, the three-dimensional virtual space may be an open space, and the virtual scene may be used for simulating the real environment in reality. For example, the virtual scene may include the sky, land, ocean, etc. The land may include environmental elements such as deserts and cities. Certainly, the virtual scene may also include virtual objects, such as buildings, vehicles, and props such as weapons required by virtual objects in the virtual scene for arming themselves or fighting with other virtual objects. The virtual scene may also be used for simulating the real environment in different weathers, such as sunny, rainy, foggy, or dark weather. Users may control the virtual objects to move in the virtual scene.

4) Virtual object, also known as a virtual character, referring to the images of a plurality of people and objects that may interact in the virtual scene, or movable objects in the virtual scene. The movable object may be a virtual character, a virtual animal, and a cartoon character, such as: characters, animals, plants, oil barrels, walls, and stones displayed in the virtual scene. The virtual object may be a virtual image representing the user in the virtual scene. The virtual scene may include a plurality of virtual objects. Each virtual object has its own shape and volume in the virtual scene and occupies a part of the space in the virtual scene.

In some embodiments, the virtual object may be a user character controlled by the operation performed on the client, or an Artificial Intelligence, (AI) set in the virtual scene battle by training, or a Non-Player Character (NPC) set in the virtual scene interaction. In some embodiments, the virtual object may be a virtual character for adversarial interaction in the virtual scene. In some embodiments, a quantity of virtual objects participating in the interaction in the virtual scene may be preset or dynamically determined according to the quantity of interactive clients.

Taking a shooting game as an example, the user may control the virtual object to freely fall, glide or open a parachute to fall in the sky of the virtual scene, running, jumping, crawling, stooping forward on the land, etc. may also control the virtual object to swim, float, or dive in the ocean. Certainly, the user may also control the virtual object to move in the virtual scene by riding the virtual vehicle. For example, the virtual vehicle may be a virtual car, a virtual aircraft, a virtual yacht, etc. The above scenes are only taken as examples, and the embodiments of this application do not specify the scenes. The user may also control the virtual object to have adversarial interaction with other virtual objects through virtual props. For example, the virtual props may be throwing virtual props such as grenades, cluster mines, and sticky grenades, or shooting virtual props such as machine guns, pistols, and rifles. This application does not specify the control type of virtual skills.

5) Virtual skills, a plurality of special functions that may assist the target virtual object to interact with other virtual objects in the virtual scene. A motion skill is one of the virtual skills, and may assist the target virtual object to move in the virtual scene such as walking, running, jumping, sliding and other skills that may produce position movement.
6) Scene data, representing a plurality of features of objects in the virtual scene during interaction. For example, the scene data may include the position of the object in the virtual scene. Certainly, based on the type of the virtual scene, the scene data may include different types of features. For example, in the virtual scene of a game, the scene data may include time (depending on the number of times that the same function may be used at a specific time) that needs to wait for the plurality of functions configured in the virtual scene, and may also represent property values of a plurality of states of the game characters, such as a health point (energy value, also known as red power) and a magic point (also known as blue power).

FIG. 1 is a schematic architecture diagram of a control system 100 of a virtual skill according to an embodiment of this application. In order to support an exemplary application, a terminal (for example, a terminal 400-1 and a terminal 400-2) is connected to a server 200 through a network 300. The network 300 may be a wide area network or a local area network, or a combination thereof. Data transmission may be achieved using wireless or wired links.

The terminal may be each type of user terminal, such as a smart phone, a tablet computer, and a laptop computer, and may also be a desktop computer, a game console, a television, or any combination of two or more of these data processing devices. The server 200 may be a separately configured server that supports a plurality of services, and may be configured as a server cluster, or a cloud server.

In practical applications, an application supporting the virtual scene is installed and run in the terminal. The application may be any one of a First-Person Shooting (FPS), a third-person shooting game, a Multiplayer Online Battle Arena games (MOBA), a Two Dimension (2D) game application, a Three Dimension (3D) game application, a virtual reality application, a three-dimensional map program, or a multiplayer gunfight survival game. The application may also be a stand-alone application, such as a stand-alone 3D game application.

The virtual scene involved in the embodiments of this application may be used for simulating a three-dimensional virtual space. The three-dimensional virtual space may be the open space, and the virtual scene may be used for simulating the real environment in reality. For example, the virtual scene may include the sky, land, ocean, etc. The land may include environmental elements such as deserts and cities. Certainly, the virtual scene may also include virtual objects, such as buildings, desks, vehicles, and props such as weapons required by virtual objects in the virtual scene for arming themselves or fighting with other virtual objects. The virtual scene may also be used for simulating the real environment in different weathers, such as sunny, rainy, foggy, or dark weather. The virtual object may be a virtual image representing the user in the virtual scene. The virtual image may be any form, such as a simulation character and a simulation animal, which is not limited in this application. In actual implementation, the user may control the virtual object to move in the virtual scene by using the terminal, and the movements includes but not limited to: at least one of adjusting the body posture, crawling, running, riding, jumping, driving, picking, shooting, attacking, throwing, or cutting.

Taking a video game scene as an exemplary scene, the user may operate on the terminal in advance. After the terminal detects the user's operation, a game configuration file of the video game may be downloaded. The game configuration file may include an application of the video game, interface display data or virtual scene data, so that the user (or player) may call the game configuration file to render and display the video game interface when logging in to the video game on the terminal. The user may perform a touch operation on the terminal. After the terminal detects the touch operation, an obtaining request of the game data corresponding to the touch operation may be sent to the server. The server determines the game data corresponding to the touch operation based on the obtaining request and returns to the terminal. The terminal renders and displays the game data. The game data may include the virtual scene data, behavior data of the virtual object in the virtual scene, etc.

In practical applications, the terminal renders the skill control corresponding to the motion skill of the target virtual object in an interface of the virtual scene. The rendering of the skill control is switched as rendering a composite skill control containing a direction indication identification when a trigger operation for the skill control is received. The composite skill control is configured to control the motion skill of the target virtual object. A property of the direction indication identification in the composite skill control is changed in response to a first direction adjustment instruction triggered on the composite skill control. The target virtual object is controlled to move along a direction indicated by the direction indication identification after the property is changed in response to a first skill release instruction triggered on the composite skill control.

Figure 2:
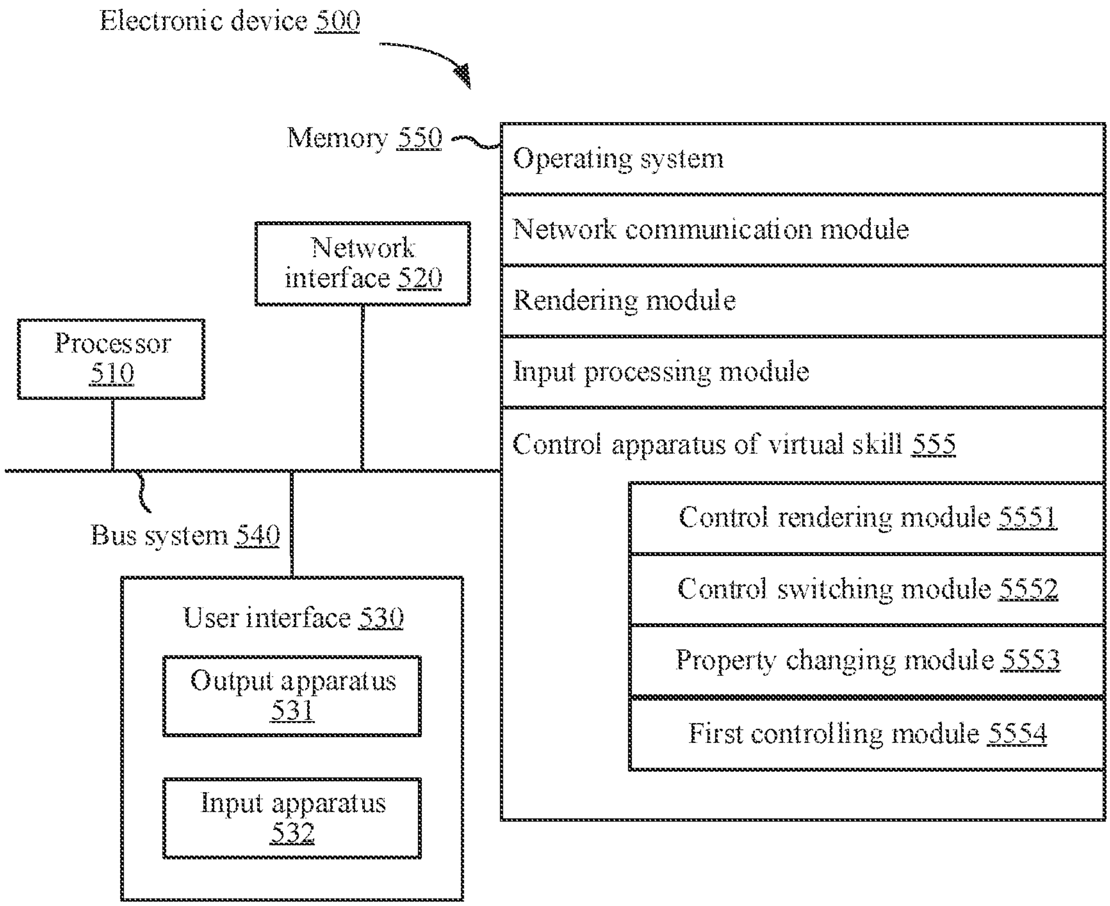
FIG. 2 is a schematic structural diagram of an electronic device 500 according to an embodiment of this application.

FIG. 2 is a schematic structural diagram of an electronic device 500 according to an embodiment of this application. In practical applications, the electronic device 500 may be a terminal 400-1, a terminal 400-2 or a server in FIG. 1. Taking the electronic device being the terminal 400-1 or terminal 400-2 as shown in FIG. 1 as an example, the electronic device implementing the control method of the virtual skill in the embodiments of this application is explained. The electronic device 500 as shown in FIG. 2 includes: at least one processor 510, a memory 550, at least one network interface 520, and a user interface 530. Components of the electronic device 500 are coupled together through a bus system 540. It may be understood that, the bus system 540 is configured to implement connection and communication between the components. In addition to a data bus, the bus system 540 also includes a power bus, a control bus, and a status signal bus. However, for the sake of clarity, various buses are marked as the bus system 540 in FIG. 2.

The processor 510 may be an integrated circuit chip with signal processing capabilities, such as a general-purpose processor, a Digital Signal Processor (DSP), or other programmable logic devices, discrete gate or transistor logic devices, discrete hardware components, etc. The general-purpose processor may be a microprocessor or any conventional processor, etc.

The user interface 530 includes one or more output apparatuses 531 that render a media content, including one or more loudspeakers and/or one or more visual display screens. The user interface 530 also includes one or more input apparatus 532 including user interface members that help user input, such as a keyboard, a mouse, a microphone, a touch display screen, a camera, other input buttons and controls.

The memory 550 may be removable, non-removable or combination thereof. An exemplary hardware device includes a solid-state memory, a hard disk drive, an optical disk drive, etc. The memory 550 includes one or more storage devices physically away from the processor 510.

The memory 550 includes a volatile memory or a non-volatile memory, and may also include both volatile and non-volatile memories. The non-volatile memory may be a Read Only Memory (ROM), and the volatile memory may be a Random Access Memory (RAM). The memory 550 described in the embodiments of this application is intended to include any suitable type of memories.

In some embodiments, the control apparatus of a virtual skill provided in the embodiments of this application may be implemented by software. FIG. 2 shows a control apparatus 555 of a virtual skill stored in the memory 550. The control apparatus 555 may be software in the form of a program and plug-in, and includes the following software modules: a control rendering module 5551, a control switching module 5552, a property changing module 5553, and a first controlling module 5554 which are logical. Therefore, arbitrary combination or further splitting may be performed according to the implemented functions. The functions of the modules are described below.

Figure 3:
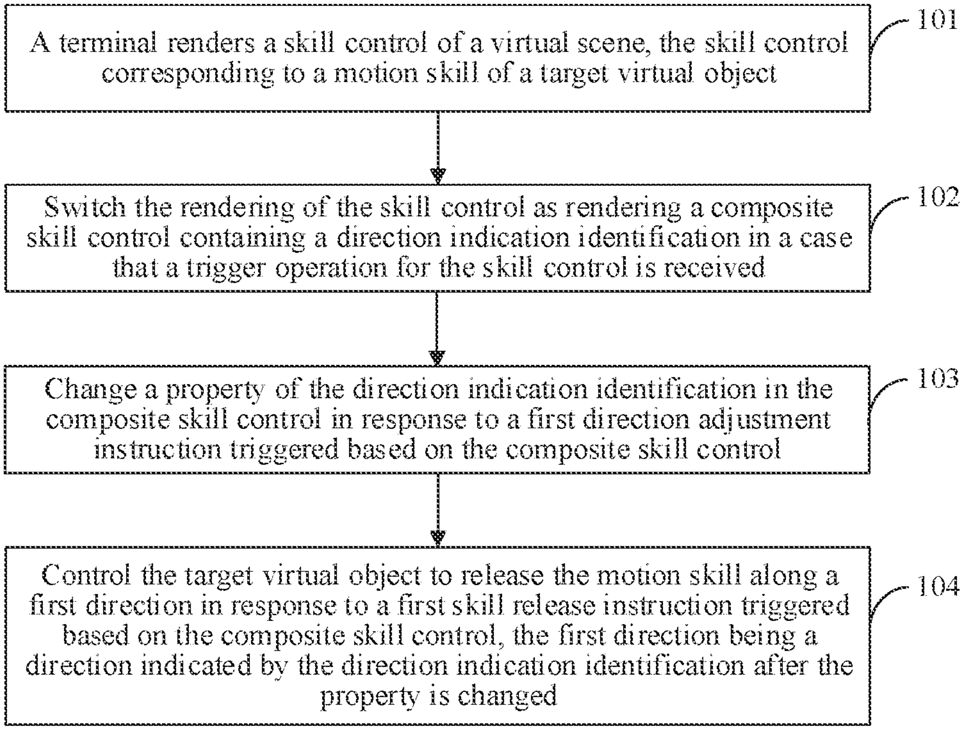
FIG. 3 is a schematic flowchart of a control method of a virtual skill according to an embodiment of this application.

Next, the control method of a virtual skill provided in the embodiments of this application is explained. In actual implementation, the method may be implemented by the server or the terminal separately, and may also be implemented by the server and the terminal together. FIG. 3 is a schematic flowchart of a control method of a virtual skill according to an embodiment of this application, and it is explained in combination with steps as shown in FIG. 3.

Step 101: A terminal renders a skill control of a virtual scene, the skill control corresponding to a motion skill of a target virtual object.

Here, the client supporting the virtual scene is installed on the terminal. When the user enables the client on the terminal and the terminal runs the client, the terminal renders an interface of the virtual scene obtained by observing from the perspective of the target virtual object, and the target virtual scene is the virtual object in the virtual scene corresponding to a current login account. In the virtual scene, the user may control the target virtual object to interact with other virtual objects based on the interface of the virtual scene. For example, the target virtual object is controlled to shoot other virtual objects with virtual shooting props, and the target virtual object may also be controlled to use virtual skills. For example, the target virtual object is controlled to use the virtual skill, namely, the motion skill to move to the target position as specified to assist the target virtual object to interact with other virtual objects in the virtual scene. In practical applications, the skill control of the virtual skill of the target virtual object that is rendered in the interface of the virtual scene may be an icon and a button corresponding to the motion skill.

Step 102: Switch the rendering the skill control as rendering a composite skill control containing a direction indication identification when a trigger operation for the skill control is received.

Here, when the user triggers (such as click, double-click, and slide) the skill control, the terminal switches the rendered skill control to the composite skill control in response to the trigger operation. The composite skill control is configured to control the motion skill of the target virtual object, such as controlling the motion direction corresponding to the target virtual, and controlling the release direction of the motion skill.

Step 103: Change a property of the direction indication identification in the composite skill control in response to a first direction adjustment instruction triggered by the composite skill control.

Here, the composite skill control includes the direction indication identification. As the user drags or slides the direction indication identification in the composite skill control, the property of the direction indication identification in the composite skill control may also change. For example, the position and angle, etc. of the direction indication identification in the composite skill control change.

The first direction adjustment instruction is used for indicating the adjustment of the release direction of the motion skill. The property of the direction indication identification in the composite skill control may indicate the release direction of the motion skill, and respond to the first direction adjustment instruction by changing the property of the direction indication identification, i.e., changing the adjustment of the indication direction through the property. Taking the position of the property as the direction indication identification in the composite skill control as an example, before triggering the first direction adjustment instruction, the position of the direction indication identification in the composite skill control is a first position, and the first position corresponds to the first release direction of the motion skill. In response to the first direction adjustment instruction triggered on the composite skill control, the position of the direction indication identification in the composite skill control is changed from the first position to a second position, and the second position corresponds to the second release direction of the motion skill. In this way, it is indicated that the release direction of the motion skill changes.

In some embodiments, the terminal may receive the first direction adjustment instruction in the following ways before changing the property of the direction indication identification in the composite skill control: rendering direction indication information used for indicating the release direction corresponding to the motion skill, and receiving the first direction adjustment instruction in response to the trigger operation for the direction indication identification in the composite skill control when a current motion direction of the target virtual object is inconsistent with the release direction.

Here, the direction indication information is used for indicating the release direction of the motion skill, i.e., indicating which direction the target virtual object is most favorable. Based on the release direction indicated by the direction indication information, when the current motion direction of the target virtual object is inconsistent with the release direction, the corresponding first direction adjustment instruction is triggered by sliding or dragging the direction indication identification in the composite skill control to control the motion skill to be released in a direction indicated by the first direction adjustment instruction. That is, the target virtual object is controlled to move in the direction indicated by the first direction adjustment instruction, so that the target virtual object may be quickly controlled to move in the optimal direction, improving the release efficiency of the motion skill.

Step 104: Control the target virtual object to release the motion skill along a first direction in response to a first skill release instruction triggered on the composite skill control, the first direction being a direction indicated by the direction indication identification after the property is changed.

Here, the user may trigger the first skill release instruction through the composite skill control, and the terminal controls the target virtual object to release the motion skill along the first direction in response to the first skill release instruction. The motion skill makes the target virtual object move. That is, the displacement is generated in the virtual scene, namely, in response to the first skill release instruction, the terminal controls the target virtual object to move along the direction indicated by the direction indication identification after the property is changed.

Figure 4:
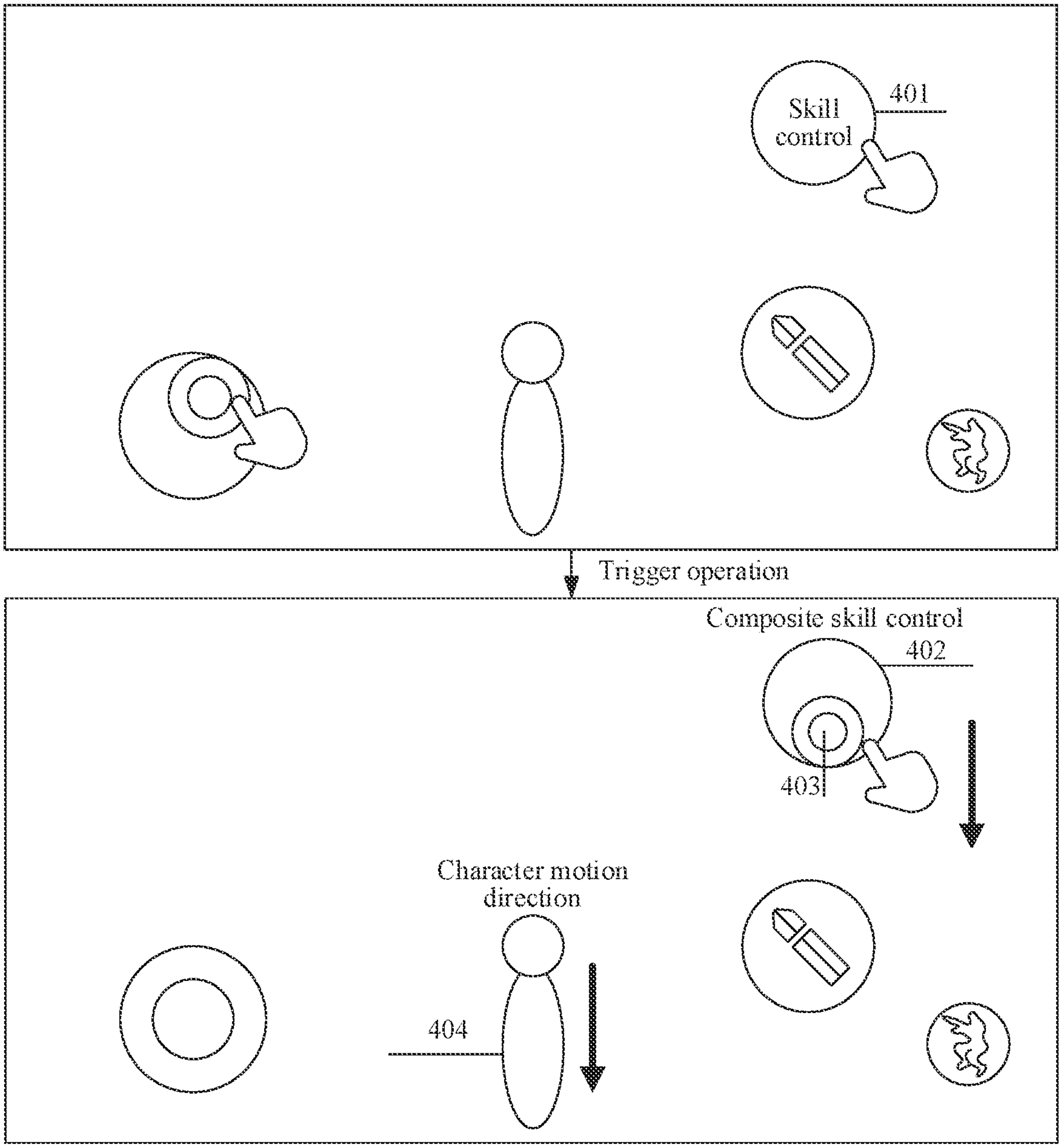
FIG. 4 is a schematic diagram of a motion of a target virtual object according to an embodiment of this application.

FIG. 4 is a schematic diagram of a motion of a target virtual object according to an embodiment of this application. When the user triggers a skill control 401, the terminal switches the rendered skill control 401 to render a composite skill control 402 in response to the trigger operation. When a direction indication identification 403 in the composite skill control 402 is dragged, the terminal receives the first direction adjustment instruction. The direction indicated by the first direction adjustment instruction is the direction indicated by the direction indication identification 403 after the property is changed. When the user releases the drag on the direction indication identification 403, or when the user drags the direction indication identification 403 by a target distance, the terminal receives the first skill release instruction and controls to release the motion skill along the direction indicated by the first direction adjustment instruction in response to the first skill control instruction. That is, a target virtual object 404 is controlled to move along the direction indicated by the first direction adjustment instruction.

In the way described above, when the user triggers the skill control corresponding to the motion skill, the rendered skill control is switched as the composite skill control. Through a composite skill control, the adjustment of the motion direction of the target virtual object and the release of the motion skill in a specified direction may be realized. This operation is simple, and improves the release efficiency of the motion skill in the specified direction, thereby improving the adaptability of the motion skill in the fast-paced virtual scene.

In some embodiments, after the terminal performs step 102, i.e., after the rendering the skill control is switched as rendering the composite skill control containing a direction indication identification, the trigger mode of the first skill release instruction may also be set as follows: rendering a skill release mode setting interface of the corresponding composite skill control; rendering a first release mode and a second release mode in the skill release mode setting interface; controlling, when a selection operation for the first release mode is received, the skill release mode of the composite skill control to be the first release mode to trigger the first skill release instruction by releasing a drag operation for the composite skill control; and controlling, when a selection operation for the second release mode is received, the skill release mode of the composite skill control to be the second release mode to trigger the first skill release instruction by dragging the composite skill control by a target distance.

Here, before using motion skills, the skill release mode of the motion skill may be set. For example, the terminal renders the skill release mode setting interface of the corresponding composite skill control in response to a click operation for the composite skill control. Alternatively, the terminal renders prompt information used for instructing the user to set the skill release mode. When the user clicks the prompt information, the terminal renders the skill release mode setting interface of the corresponding composite skill control in response to a click operation for the prompt information, and renders a plurality of alternative skill release modes in the skill release mode setting interface. The trigger mode of the first skill release instruction indicated by different skill release modes is different.

Figure 5:
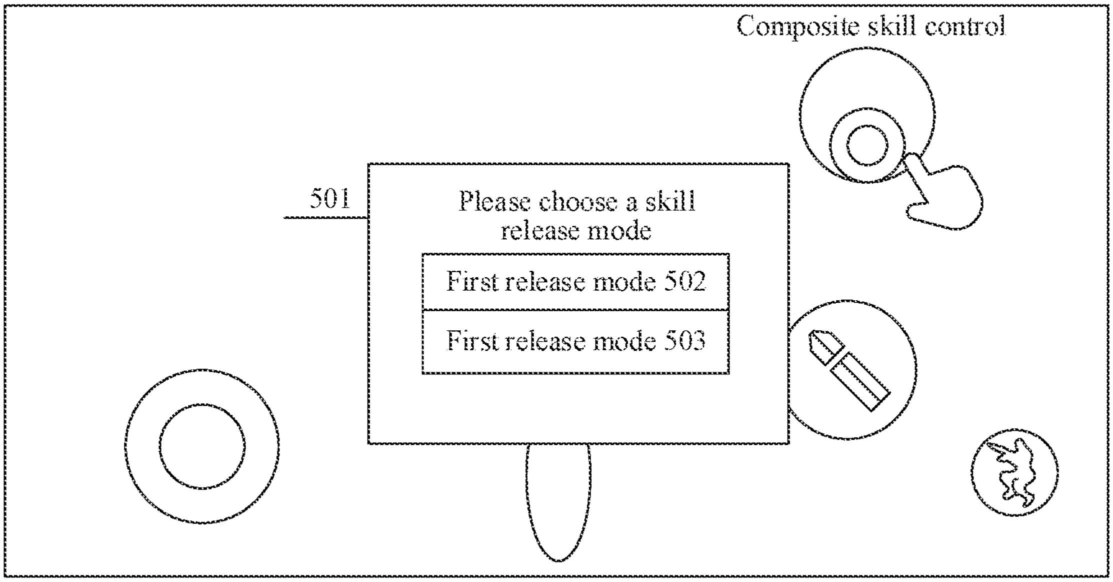
FIG. 5 is a schematic diagram of a skill release mode according to an embodiment of this application.

FIG. 5 is a schematic diagram of a skill release mode according to an embodiment of this application. In a skill release mode setting interface 501, alternative skill release modes are rendered, such as a first release mode 502 and a second release mode 503. When the user chooses the first release mode 502, the skill release mode of the composite skill control is controlled as the first release mode. That is, subsequent user may trigger the first skill release instruction by releasing the drag operation for the composite skill control (substantially the direction indication identification) in the process of adjusting the motion direction of the target virtual object by dragging the composite skill control (the essence of the drag is the direction indication identification). When the user chooses the second release mode 503, the skill release mode of the composite skill control is controlled as the second release mode. That is, subsequent user may trigger the first skill release instruction by dragging the composite skill control (substantially the direction indication identification) by the target distance in the process of adjusting the motion direction of the target virtual object by dragging the composite skill control (the essence of the drag is the direction indication identification).

In some embodiments, the terminal may receive the first direction adjustment instruction in the following way before changing the property of the direction indication identification in the composite skill control: receiving the first direction adjustment instruction triggered on a drag operation in response to the drag operation for the direction indication identification in the composite skill control. Correspondingly, before the terminal controls the target virtual object to release the motion skill along the first direction, the first skill release instruction may be received in the following ways: receiving the first skill release instruction when a release mode corresponding to the composite skill control is the first release mode and the drag operation is released; and receiving the first skill release instruction when a release mode corresponding to the composite skill control is the second skill release mode and a dragging distance corresponding to the drag operation reaches the target distance.

Here, when the user drags the direction indication identification in the composite skill control, the first direction adjustment instruction may be triggered, and dragging the direction indication identification in the composite skill control results in the change of the property of the direction indication identification in the composite skill control, which may represent the change of the release direction (i.e., the motion direction) of the motion skill indicated by the first direction adjustment instruction. The direction indicated by the first direction adjustment instruction is the release direction of the motion skill, and the release direction of the motion skill is the motion direction of the target virtual object when the skill is released. If the user has selected the first skill release mode as the release mode of the composite skill control, the terminal may receive the first skill release instruction when the user releases the drag operation for the direction indication identification. If the user has selected the second skill release mode as the release mode of the composite skill control, the terminal may receive the first skill release instruction when the user drags the direction indication identification by the target distance, i.e., when the dragging distance of the drag operation for the direction indication identification reaches the target distance.

In some embodiments, the terminal may control the target virtual object to release the motion skill along the first direction in the following ways: obtaining a mapping relationship between the property of the direction indication identification in the composite skill control and the release direction of the motion skill; determining the direction indicated by the first direction adjustment instruction as a first direction based on the changed property of the direction indication identification in the composite skill control and the mapping relationship; and controlling the target virtual object to release the motion skill along the first direction, e.g., controlling the target virtual object to move along the first direction.

In practical applications, since the property of the direction indication identification in the composite control has a certain mapping relationship with the release direction of the motion skill, the direction indicated by the direction indication identification after the property is changed is the direction indicated by the first direction adjustment instruction. For example, before dragging or sliding the direction indication identification, the center of the direction indication identification coincides with the center of the skill control. When the direction indication identification is slid or dragged along the 45-degree direction from the center, the triggered direction adjustment instruction indicates that the target virtual object moves along the 45-degree direction. Therefore, the user may adjust the motion direction of the target virtual object by dragging or sliding the direction indication identification to change the property of the direction indication identification in the composite skill control, and control the target virtual object to move in the adjusted motion direction.

In some embodiments, the terminal may control the target virtual object to move along the direction indicated by the direction indication identification after the property is changed in the following ways: determining a level of the target virtual object and a target distance corresponding to the level, the target distance being a motion distance of the target virtual object when the motion skill is released; taking a current position of the target virtual object as a starting point, and determining a target position at the target distance from the starting point along the first direction; and controlling the target virtual object to move to the target position along the first direction.

Here, the first direction is a direction of motion of the target virtual object indicated by the first direction adjustment instruction, i.e., the release direction of the motion skill. For the same motion skill, when the motion skill is released, if the level of the target virtual object is different, the distance that may control the movement of the target virtual object under the action of the release skill is also different. In general, the higher the level of the target virtual object is, the farther distance the target virtual object may be controlled. Here, based on the level of the target virtual object, it is determined that under the action of the released motion skills, the target virtual object starts from the current position and moves along the release direction of the motion skills. The distance from the current position is the target position at the target distance, and the target virtual object is controlled to move along the release direction of the motion skills to the target position.

In some embodiments, the terminal may control the target virtual object to move to the target position along the direction indicated by the direction indication identification after the property is changed in the following ways: performing obstacle detection on the target position to obtain a detection result; controlling the target virtual object to move to the target position along the first direction when the detection result represents that no obstacle exists at the target position; and correspondingly, controlling the target virtual object to move to the target position along the first direction when the detection result represents that an obstacle exists at the target position. No obstacle exists at the other positions, and distances between the other positions and the target position are smaller than a distance threshold.

Here, in order to correct a loophole of motion logic, obstacle detection may be performed on whether there is an obstacle at the target position. If the obstacle is detected at the target position, the target position is not accessible. In practical implementations, through the camera component bound on the target virtual object or the camera component bound on the virtual prop used by the target virtual object, a detection ray consistent with an orientation of the target virtual object may be emitted from the current position of the target virtual object, or the detection ray consistent with the orientation of the virtual prop may be emitted from the position of the virtual prop, and the obstacle at the target position may be determined based on the detection ray.

For example, through the camera component on the virtual prop used by the target virtual object, the detection ray consistent with an orientation of the virtual props is emitted from the position of the virtual prop, and whether there is an obstacle at the target position is determined by the detection ray. When the detection ray intersects with a collider component (such as a collision box and a collision ball) bound to the obstacle (such as a wall, an oil drum, and other objects that hinder the movement of the target virtual object), it is indicated that there is an obstacle at the target position. When the detection ray does not intersect with the collider component bound to the obstacle, there is no obstacle at the target position.

In a case of determining that there is an obstacle at the target position, the target virtual object is controlled to move to other positions without the obstacle to meet initial needs of the user as much as possible. In a case of determining there is no obstacle at the target position, the target virtual object is controlled to move to the target position along the direction indicated by the direction indication identification after the property is changed.

In some embodiments, in the process of controlling the target virtual object to release the motion skill along the first direction, the terminal automatically adjusts a motion route of the target virtual object to avoid the obstacle when the target virtual object moves to a blocking area where the obstacle exists and the target virtual object cannot pass through the blocking area and controls the target virtual object to maintain the motion in the current motion direction when the target virtual object moves to the blocking area where the obstacle exists and the target virtual object passes through the blocking area.

In order to correct the loophole of motion logic, in the process of controlling the motion of the target virtual object, whether there is a blocking area in front of the motion of the target virtual object may be detected. In a case of detecting that the blocking area of the obstacle exists in front of the motion of the target virtual object, it is determined whether the target virtual object may pass through the blocking area. When the target virtual object cannot pass through the blocking area, it is indicated that there is the blocking area in front of the target virtual object and the blocking area is not accessible. In this case, the target virtual object is controlled to adjust the motion route to avoid the blocking object. When the target virtual object may pass through (such as skip and penetrate through) the blocking area, it is indicated that there is a blocking area in front of the target virtual object, but the blocking area may be accessible. In this case, the target virtual object is controlled to continue to move at the position in the current motion direction.

In practical implementations, through the camera component bound on the target virtual object or the camera component bound on the virtual prop used by the target virtual object, a detection ray consistent with the orientation of the target virtual object may be emitted from the current position of the target virtual object, or the detection ray consistent with the orientation of the virtual prop may be emitted from the position of the virtual prop. Whether there is an obstacle in front of the motion of the target virtual object is determined based on the detection ray. The specific detection mode is similar to the detection mode of whether there is the obstacle at the above detection target position, and the details are not repeated here.

In some embodiments, the terminal may also release the motion skill in the following ways to control the motion of the target virtual object: rendering a mobile control configured to control a motion direction of the target virtual object, determining a direction indicated by a second direction adjustment instruction to be a second direction when the second direction adjustment instruction triggered on the mobile control is received: and controlling the target virtual object to release the motion skill along the second direction in response to a second skill release instruction triggered on the skill control.

Here, the mobile control is configured to control the motion direction of the target virtual object. When the user first triggers the mobile control to adjust the release direction of the motion skill, the skill control is configured to release the corresponding motion skill. In practical applications, when the user triggers (such as drags and slides) the mobile control, the terminal receives the corresponding second direction adjustment instruction. The direction indicated by the second adjustment instruction is a drag direction or a sliding direction for the mobile control. When the user triggers the skill control, the terminal receives the second skill release instruction for the motion skill and controls the motion skill to be released in the direction indicated by the second adjustment instruction in response to the second skill release instruction, that is, the target virtual object is controlled to move in the direction indicated by the second adjustment instruction.

Figure 6:
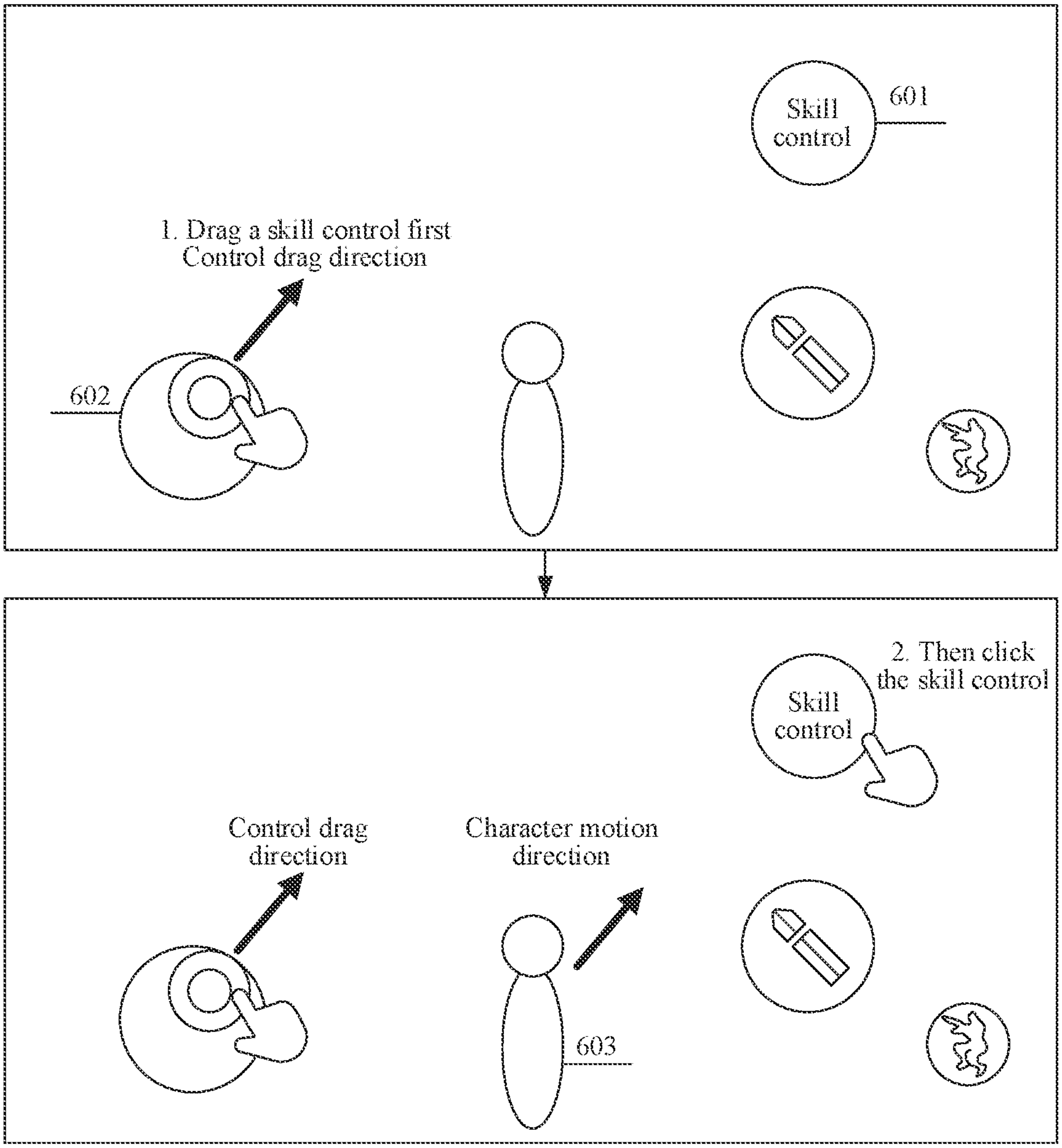
FIG. 6 is a schematic diagram of a motion of a target virtual object according to an embodiment of this application.

FIG. 6 is a schematic diagram of a motion of a target virtual object according to an embodiment of this application. A skill control 601 and a mobile control 602 are rendered in the interface of the virtual scene. When the user first triggers the mobile control 602, the terminal receives the second direction adjustment instruction, and determines the drag direction or sliding direction for the mobile control as the direction indicated by the second direction adjustment instruction. Then, the user triggers the skill control, the terminal receives the corresponding second skill release instruction, and controls the target virtual object 603 to move along the direction indicated by the second direction adjustment instruction.

It is to be understood that in FIG. 6, if the user first triggers the skill control 601, the skill control 602 is configured to evoke the composite skill control. Through the composite skill control, the adjustment of the motion direction of the target virtual object (that is, the adjustment of the release direction of the motion skill) and the control of a release time of the motion skill (see step 101 to step 104) may be realized, which is abbreviated as mode I. When the user first triggers the skill control 602, and then triggers the skill control 601, the adjustment of the motion direction of the target virtual object is realized through the mobile control (that is, the adjustment of the release direction of the motion skill) and the control of the release time of the motion skill is realized through the skill control 601, which is abbreviated as mode II. In view of the above, the two different implementations of mode I and mode II may achieve the purpose of controlling the target virtual object to move along the direction indicated by the direction adjustment instruction. In this way, the realization of the release of the motion skill along the specified direction is enriched. The user may choose any way based on operation habits and actual situations, which satisfies the user's demand for optionality of the implementations.

In some embodiments, the terminal may also receive a third direction adjustment instruction triggered on the composite skill control in the process of controlling the target virtual object to release the motion skill along the second direction. In response to the third skill release instruction triggered on the composite skill control, when the third direction indicated by the third direction adjustment instruction is inconsistent with the second direction, the target virtual object is controlled to transform the release direction of the motion skill from the second direction to the third direction, that is, the target virtual object is controlled to move along the third direction (i.e., to release the motion skill).

Figure 7:
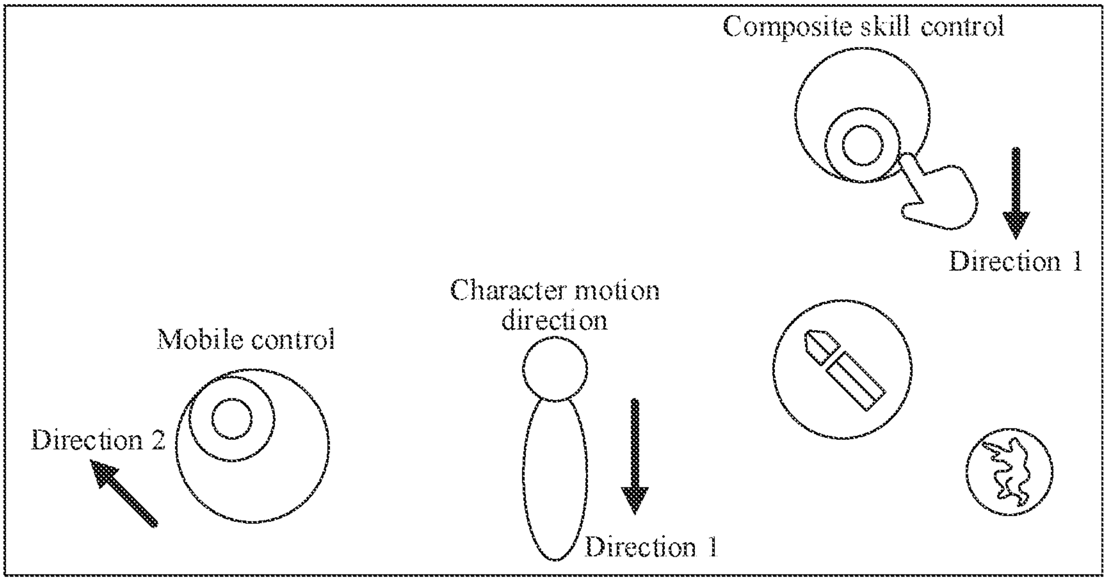
FIG. 7 is a schematic diagram of a motion of a target virtual object according to an embodiment of this application.

Here, in the process of controlling the target virtual object to move along the second direction based on the mode I, when the terminal receives the third direction adjustment instruction and the third skill release instruction triggered by the mode I, the terminal compares the third direction indicated by the third direction adjustment instruction with the second direction indicated by the second direction adjustment instruction. When the third direction is inconsistent with the second direction, the target virtual object may be controlled to move along the third direction indicated by the third direction adjustment instruction triggered by the mode I because the implementation process of the mode I is simpler and faster. FIG. 7 is a schematic diagram of a motion of a target virtual object according to an embodiment of this application. When a direction 1 indicated by the third direction adjustment instruction triggered by the composite skill control in the mode I is inconsistent with a direction 2 indicated by the second direction adjustment instruction triggered by the mobile control in the mode 11, the target virtual object is controlled to move in accordance with the direction 1.

It is to be illustrated that in practical applications, different priorities may be set for the mode I and the mode II. When the terminal simultaneously receives the direction adjustment instruction triggered by the mode I and the direction adjustment instruction triggered by the mode II, and the directions indicated by the two direction adjustment instructions are inconsistent, the target virtual object is controlled to move in the direction indicated by the direction adjustment instruction triggered by a mode with high priority.

In some embodiments, the terminal may also release the motion skill in the following ways to control the motion of the target virtual object: determining the orientation of the target virtual object in the virtual scene; and controlling the target virtual object to release the motion skill along its own orientation (i.e., motion) when the skill release instruction triggered on the skill control is received.

Here, in practical applications, if the user directly triggers the skill control without adjusting the motion direction of the target virtual object, the terminal receives the corresponding skill release instruction and controls the target virtual object to move along its own orientation in response to the skill control instruction. In this way, the need to quickly release the motion skill without adjusting the motion direction is met.

In some embodiments, the terminal receives a fourth direction adjustment instruction triggered on the mobile control in the process of controlling the target virtual object to move along the first direction. The target virtual object is controlled to maintain the motion along the first direction when the first direction is inconsistent with a fourth direction indicated by the fourth direction adjustment instruction.

Here, in the process of controlling the target virtual object to move in the direction indicated by the first direction adjustment instruction triggered by the mode I, when the fourth direction adjustment instruction triggered on the mode 11 is received, the terminal compares the first direction with the fourth direction. When the first direction is inconsistent with the fourth direction, the target virtual object may be controlled to maintain to move along the first direction triggered by the mode I because the implementation process of the mode I is simpler and faster.

By applying the above embodiments of this application, the composite skill control is evoked by triggering the skill control. The adjustment of the motion direction for the target virtual object and the release of the motion skill in the specified direction may be realized through one composite skill control. This operation is simple, and improves the release efficiency of the motion skill in the specified direction, the efficiency of human-computer interaction and the utilization of hardware resources, and improves the adaptability in the fast-paced virtual scene and the user's operating experience.

Exemplary application of the embodiments of this application in a practical application scene is illustrated below. Taking the virtual scene being a game as an example, the control method of the virtual skill provided by the embodiments of this application is explained. The operation method used in related technologies in the release of the motion skill is relatively simple. For example, a skill button corresponding to the motion skill is first clicked to control the character to move by a certain distance along its own orientation, and a lens is controlled to move to change the motion direction of the character. In this way, the motion skill may be released in the specified direction only through the cooperation of the skill button and a lens button. The operation is cumbersome and inefficient, and cannot adapt to the fast-paced virtual scene.

With this regard, the embodiments of this application provide a control method and apparatus of a virtual skill, a device and a non-transitory computer readable storage medium. By triggering the skill control to evoke the composite skill control, the adjustment of the motion direction of the target virtual object and the release of the motion skill in the specified direction may be realized through the composite skill control. The operation is simple and the release efficiency of the motion skill in the specified direction is improved.

Figure 8:
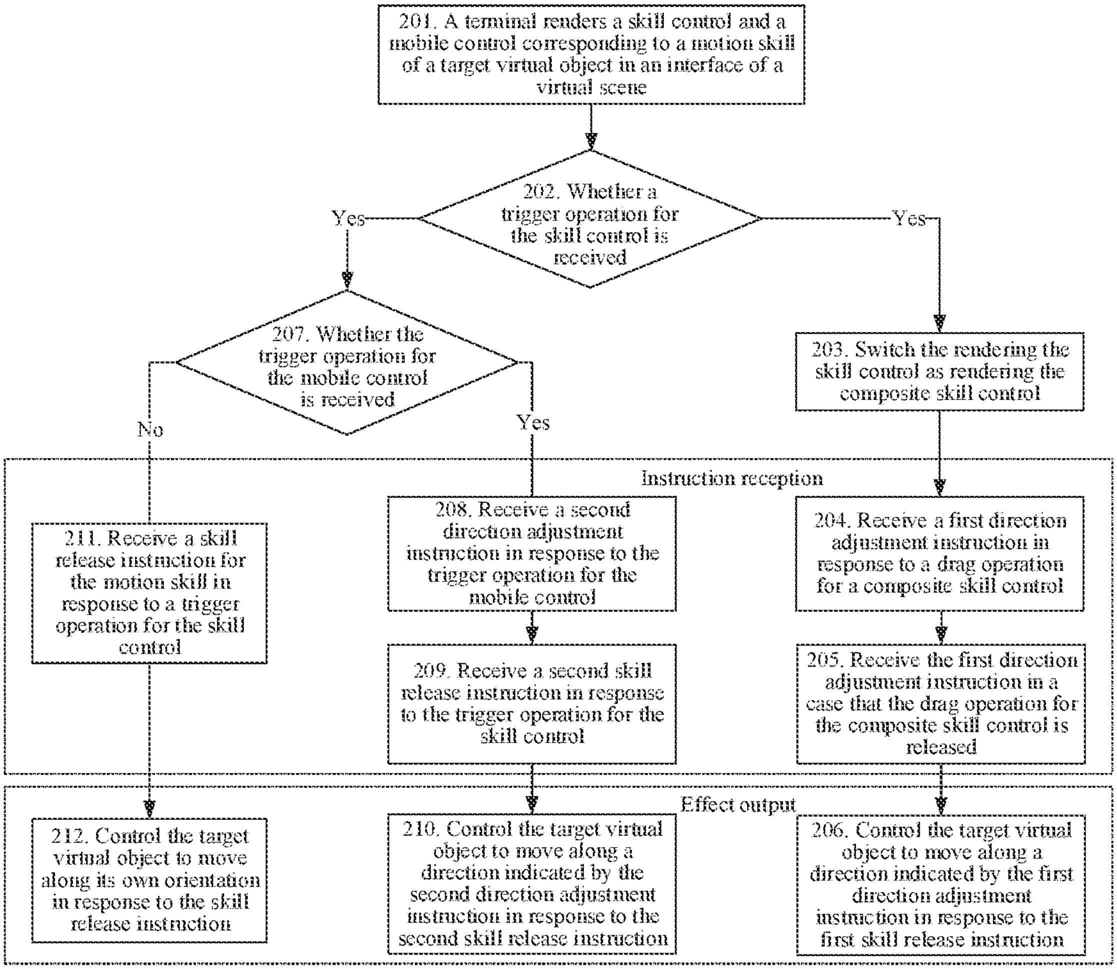
FIG. 8 is a schematic flowchart of a control method of a virtual skill according to an embodiment of this application.

FIG. 8 is a schematic flowchart of a control method of a virtual skill according to an embodiment of this application. The method includes the following steps:

Step 201: A terminal renders a skill control and a mobile control corresponding to a motion skill of a target virtual object in an interface of a virtual scene.

Here, the mobile control (or a mobile rocker) is configured to control the motion direction of the target virtual object. When the user first triggers the mobile control to adjust the release direction (i.e., the motion direction of the target virtual object) of the motion skill, the skill control (or the skill button) is configured to release the corresponding motion skill. When the user first triggers the skill control, the skill control is configured to evoke the composite skill control (or called a skill wheel, which belongs to a rocker). The composite skill control is configured to adjust the release direction of the motion skill and control the release time of the motion skill.

Step 202: Determine whether a trigger operation of the skill control is received.

Here, when the terminal receives the trigger operation for the skill control, step 203 is performed. Otherwise, step 207 is performed.

Step 203: Switch the rendering the skill control as rendering a composite skill control.

Step 204: Receive a first direction adjustment instruction in response to a drag operation for the composite skill control.

Here, the composite skill control is substantially a rocker, which contains a direction indication identification that may be dragged. The position and the angle, etc. of the direction indication identification in the composite skill control change as the user drags the direction indication identification in the composite skill control. The direction indicated by the first direction adjustment instruction is the direction of the changed direction indication identification relative to the composite skill control. For example, before the direction indication identification in the composite skill control is dragged, the center of the direction indication identification coincides with the center of the skill control. When the direction indication identification is dragged along a 45-degree direction from the center. The triggered first direction adjustment instruction may instruct the target virtual object to move along a 45-degree direction.

Step 205: Receive the first skill release instruction when the drag operation for the composite skill control is released.

Here, when the user releases the drag on the direction indication identification, the first skill release instruction for the motion skill is triggered. In practical applications, other implementations triggering the first skill release instruction may also be set. For example, when the direction indication identification is dragged to an edge of the composite skill control, or dragging the dragging distance of the direction indication identification reaches a target distance, the corresponding first skill release instruction may be triggered without loosening the drag on the direction indication identification. These implementations may be set in the interface of the virtual scene for users to choose.

Step 206: Control the target virtual object to move along the direction indicated by the first direction adjustment instruction in response to the first skill release instruction.

Here, when the terminal receives the first skill release instruction for the motion skill, the release of the motion skill may be controlled along the direction indicated by the first adjustment instruction, that is, the target virtual object is controlled to move along the direction indicated by the first adjustment instruction.

Step 207: Determine whether the trigger operation for the mobile control is received.

Here, when the terminal receives the trigger operation for the mobile control, step 208 is performed. Otherwise, step 211 is performed.

Step 208: Receive a second direction adjustment instruction in response to the trigger operation for the mobile control.

In practical applications, when the user triggers (such as drags and slides) the mobile control, the terminal receives the corresponding second direction adjustment instruction. The direction indicated by the second adjustment instruction is the drag direction or sliding direction for the mobile control.

Step 209: Receive the second skill release instruction in response to the trigger operation for the skill control.

Step 210: Control the target virtual object to move along the direction indicated by the second direction adjustment instruction in response to the second skill release instruction.

When the user triggers the skill control, the terminal receives the second skill release instruction for the motion skill and controls the motion skill to be released in the direction indicated by the second adjustment instruction in response to the second skill release instruction, that is, the target virtual object is controlled to move in the direction indicated by the second adjustment instruction.

Step 211: Receive a skill release instruction for the motion skill in response to the trigger operation for the skill control.

Step 212: Control the target virtual object to move along its own orientation in response to the skill release instruction.

In practical applications, if the user directly triggers the skill control without adjusting the motion direction of the target virtual object, the terminal receives the corresponding skill release instruction and controls the target virtual object to move along its own orientation in response to the skill control instruction. In this way, the need to quickly release the motion skill without adjusting the motion direction is met.

It may be seen from FIG. 8 that step 201 to step 206 are a realization mode of controlling the motion direction of the target virtual object and the release time of the motion skill through the composite skill control (abbreviated as the mode I). Step 201 to step 202 and step 207 to step 210 are a realization mode of adjusting the motion direction of the target virtual object through the mobile control, and then controlling the release time of the motion skill through the skill control (abbreviated as the mode II). Step 201 to step 202, step 207, and step 211 to step 212 are a realization mode of rapidly releasing the motion skill without adjusting the motion direction (abbreviated as a mode III). In view of the above, the two different implementations of the mode I and the mode II may achieve the purpose of controlling the target virtual object to move along the direction indicated by the direction adjustment instruction.

In practical applications, different priorities may also be set for the mode I and the mode II. When the terminal simultaneously receives the direction adjustment instruction triggered by the mode I and the direction adjustment instruction triggered by the mode II, and the directions indicated by the two direction adjustment instructions are inconsistent, the target virtual object is controlled to move in the direction indicated by the direction adjustment instruction triggered by a mode with high priority.

Through the above methods, fusion of the embodiments of this application realizes the realization mode of a plurality of control motion skills released along the specified direction, and supports 360° omni-directional adjustment of the motion direction of the target virtual object without relying on the lens, which enriches the realization of the motion skill released in the specified direction. The user may choose any way based on the operation habits and the actual situation, which meets the user's optional needs for the implementation.

Figure 9:
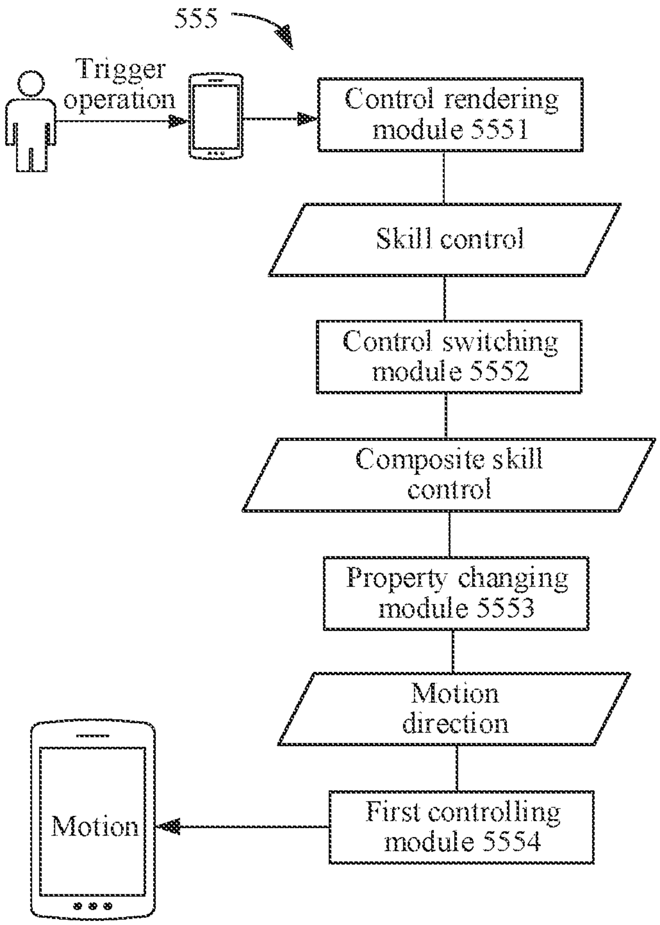
FIG. 9 is a schematic structural diagram of a control apparatus of a virtual skill according to an embodiment of this application.

The following continues to explain that the implementation of a control apparatus 555 of a virtual skill provided by the embodiments of this application is an exemplary structure of a software module. In some embodiments, FIG. 9 is a schematic structural diagram of a control apparatus of a virtual skill according to an embodiment of this application. The software module in the control device 555 of a virtual skill stored in a memory 550 in FIG. 2 may include a control rendering module 5551, a control switching module 5552, a property changing module 5553, and a first controlling module 5554.

The control rendering module 5551 is configured to render a skill control of a virtual scene, the skill control corresponding to a motion skill of a target virtual object.

The control switching module 5552 is configured to switch the rendering of the skill control as rendering a composite skill control containing a direction indication identification when a trigger operation for the skill control is received.

The composite skill control is configured to control the motion skill of the target virtual object.

The property changing module 5553 is configured to change a property of the direction indication identification in the composite skill control in response to a first direction adjustment instruction triggered on the composite skill control.

The first controlling module 5554 is configured to control the target virtual object to release the motion skill along a first direction in response to a first skill release instruction triggered on the composite skill control, the first direction being a direction indicated by the direction indication identification after the property is changed.

In some embodiments, the apparatus further includes a mode setting module.

The mode setting module is configured to render a skill release mode setting interface of the corresponding composite skill control;

render a first release mode and a second release mode in the skill release mode setting interface;

control, when a selection operation for the first release mode is received, the skill release mode of the composite skill control to be the first release mode to trigger the first skill release instruction by releasing a drag operation for the composite skill control; and control, when a selection operation for the second release mode is received, the skill release mode of the composite skill control to be the second release mode to trigger the first skill release instruction by dragging the composite skill control by a target distance.

In some embodiments, the apparatus further includes an instruction receiving module.

The instruction receiving module is configured to receive a first direction adjustment instruction triggered on the drag operation in response to the drag operation for the direction indication identification.

The instruction receiving module is further configured to receive the first skill release instruction when a release mode corresponding to the composite skill control is the first release mode and the drag operation is released; and receive the first skill release instruction when a release mode corresponding to the composite skill control is the second skill release mode and a dragging distance corresponding to the drag operation reaches the target distance.

In some embodiments, the apparatus further includes a second controlling module.

The second controlling module is configured to render a mobile control configured to control a motion direction of the target virtual object;

determine a direction indicated by a second direction adjustment instruction to be a second direction when the second direction adjustment instruction triggered on the mobile control is received: and control the target virtual object to release the motion skill along the second direction in response to a second skill release instruction triggered on the skill control.

In some embodiments, the apparatus further includes a third controlling module.

The third controlling module is configured to receive a third direction adjustment instruction triggered on the composite skill control in the process of controlling the target virtual object to release the motion skill along the second direction; and control the target virtual object to transform a release direction of the motion skill from the second direction to the third direction in response to a third skill release instruction triggered on the composite skill control, when a third direction indicated by the third direction adjustment instruction is inconsistent with the second direction.

In some embodiments, the apparatus further includes a fourth controlling module.

The fourth controlling module is configured to determine an orientation of the target virtual object in the virtual scene; and control the target virtual object to release the motion skill along the orientation when a skill release instruction triggered on the skill control.

In some embodiments, the apparatus further includes a fifth controlling module.

The fifth controlling module is configured to render a mobile control configured to control a motion direction of the target virtual object;

receive a fourth direction adjustment instruction triggered on the mobile control in the process of controlling the target virtual object to release the motion skill along the first direction; and control the target virtual object to maintain the release of the motion skill along the first direction when the first direction is inconsistent with the fourth direction indicated by the fourth direction adjustment instruction.

In some embodiments, the instruction receiving module is further configured to render direction indication information used for indicating the release direction corresponding to the motion skill, and receive the first direction adjustment instruction in response to the trigger operation for the direction indication identification in the composite skill control when a current motion direction of the target virtual object is inconsistent with the release direction.

In some embodiments, the first controlling module is further configured to obtain a mapping relationship between the property of the direction indication identification in the composite skill control and the release direction of the motion skill;

determine a direction indicated by the first direction adjustment instruction as the first direction based on the changed property and the mapping relationship; and control the target virtual object to release the motion skill along the first direction.

In some embodiments, the first controlling module is further configured to determine a level of the target virtual object and a target distance corresponding to the level, the target distance being a motion distance of the target virtual object when the motion skill is released;

take a current position of the target virtual object as a starting point, and determine a target position at the target distance from the starting point along the first direction; and control the target virtual object to move to the target position along the first direction.

In some embodiments, the first controlling module is further configured to perform the obstacle detection on the target position to obtain a detection result;

control the target virtual object to move to the target position along the first direction when the detection result represents that no obstacle exists at the target position: and control the target virtual object to move to the target position along the first direction when the detection result represents that obstacle exists at the target position.

No obstacle exists at the other positions, and distances between the other positions and the target position are smaller than a distance threshold.

In some embodiments, the apparatus further includes a sixth controlling module.

The sixth controlling module is configured to automatically adjust a motion route of the target virtual object to avoid the obstacle when the target virtual object moves to a blocking area where an obstacle exists and the target virtual object cannot pass through the blocking area, in the process of controlling the target virtual object to move along the first direction; and control the target virtual object to maintain the motion in the current motion direction when the target virtual object moves to the blocking area where the obstacle exists and the target virtual object passes through the blocking area.

Embodiments of this application provide a computer program product or a computer program. The computer program product or the computer program includes a computer instruction stored in a non-transitory computer readable storage medium. A processor of a computer device reads the computer instruction from the computer readable storage medium, and the processor executes the computer instruction, so that the computer device executes the control method of a virtual skill in the embodiments of this application.

Embodiments of this application provide a non-transitory computer readable storage medium having an executable instruction stored thereon. The executable instruction, when executed by a processor, causes the processor to execute the control method of a virtual skill provided by the embodiments of this application.

Embodiments of this application provide a computer program product, including a computer program or an instruction, when executed by a processor, implementing the control method of a virtual skill provided by the embodiments of this application.

In some embodiments, the computer readable storage medium may be a memory, such as a Read-Only Memory (ROM), a Random Access Memory (RAM), an Erasable Programmable Read-Only Memory (EPROM), an Electrically Erasable Programmable Read-Only Memory (EEPROM), a flash memory, a magnetic surface memory, an optical disk, or a CD-ROM, and may also be a plurality of devices including one of the above memories or any combination thereof.

In some embodiments, the executable instruction may be written in the form of program, software, software module, script, or code in any form of programming language (including compilation or interpretation language, or declarative or procedural language), and the executable instruction may be deployed in any form, including being deployed as an independent program or being deployed as a module, component, subroutine, or other units suitable for use in a computing environment.

As an example, the executable instruction may but not necessarily correspond to a file in a file system, and may be stored as a part of the file that stores other programs or data, for example, stored in one or more scripts in a Hyper Text Markup Language (HTML) document, stored in a single file dedicated to the program under discussion, or stored in a plurality of collaborative files (for example, a file that stores one or more modules, subroutines, or code parts).

As an example, the executable instruction may be deployed to execute on one computing device or on a plurality of computing devices located in one location, alternatively, on a plurality of computing devices distributed in a plurality of locations and interconnected through communication networks.

In this application, the term “unit” or “module” in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing is only an example of embodiments of this application and is not intended to limit the scope of protection of this application. Any modification, equivalent replacement and improvement within the spirit and scope of this application are included in the scope of protection of this application.

What is claimed is:

1. A control method of a virtual skill performed by an electronic device, the method comprising:

rendering a skill control of a virtual scene, the skill control corresponding to a motion skill of a target virtual object;

rendering a composite skill control containing a direction indication identification when a trigger operation for the skill control is received; and controlling the target virtual object to release the motion skill along a first direction according to a current property of the direction indication identification in the composite skill control in response to a first skill release instruction triggered on the composite skill control, further comprising:

determining a level of the target virtual object and a target distance corresponding to the level; and controlling the target virtual object to move from a current position to a target position along the first direction according to the target distance.

2. The method according to claim 1, wherein the method further comprises:

rendering a skill release mode setting interface of the composite skill control, the skill release mode setting interface including a first release mode and a second release mode;

when a selection operation for the first release mode is received, controlling the composite skill control to trigger the first skill release instruction by releasing a drag operation of the composite skill control; and when a selection operation for the second release mode is received, controlling the composite skill control to trigger the first skill release instruction by dragging the composite skill control by a target distance.

3. The method according to claim 1, wherein the method further comprises:

rendering a mobile control, the mobile control being configured to control a motion direction of the target virtual object;

determining a second direction in response to a second direction adjustment instruction triggered on the mobile control; and controlling the target virtual object to release the motion skill along the second direction in response to a second skill release instruction triggered on the skill control.

4. The method according to claim 3, wherein the method further comprises:

receiving a third direction adjustment instruction triggered on the composite skill control in the process of controlling the target virtual object to release the motion skill along the second direction; and controlling the target virtual object to transform a release direction of the motion skill from the second direction to the third direction in response to a third skill release instruction triggered on the composite skill control.

5. The method according to claim 1, wherein the method further comprises:

rendering a mobile control, the mobile control being configured to control a motion direction of the target virtual object;

receiving a fourth direction adjustment instruction triggered on the mobile control in the process of controlling the target virtual object to release the motion skill along the first direction; and controlling the target virtual object to maintain the release of the motion skill along the first direction when the first direction is inconsistent with a fourth direction indicated by the fourth direction adjustment instruction.

6. The method according to claim 1, wherein the current property of the direction indication identification in the composite skill control is changed in response to a first direction adjustment instruction triggered on the composite skill control.

7. The method according to claim 6, wherein the method further comprises:

receiving the first direction adjustment instruction when a current motion direction of the target virtual object is inconsistent with a release direction of the motion skill.

8. The method according to claim 1, wherein the controlling the target virtual object to release the motion skill along a first direction comprises:

determining the first direction based on a mapping relationship between the current property of the direction indication identification in the composite skill control and a release direction of the motion skill; and controlling the target virtual object to release the motion skill along the first direction.

9. The method according to claim 1, wherein the controlling the target virtual object to move from a current position to a target position along the first direction according to the target distance comprises:

performing obstacle detection on the target position to obtain a detection result;

when the detection result represents that no obstacle exists at the target position, controlling the target virtual object to move to the target position along the first direction according to the target distance; and when the detection result represents that an obstacle exists at the target position, controlling the target virtual object to move to other positions along the first direction according to a distance less than the target distance.

10. An electronic device, comprising:

a memory, configured to store an executable instruction; and a processor, configured to execute the executable instruction stored in the memory to implement a control method of a virtual skill including:

rendering a skill control of a virtual scene, the skill control corresponding to a motion skill of a target virtual object;

rendering a composite skill control containing a direction indication identification when a trigger operation for the skill control is received; and controlling the target virtual object to release the motion skill along a first direction according to a current property of the direction indication identification in the composite skill control in response to a first skill release instruction triggered on the composite skill control, further comprising:

determining a level of the target virtual object and a target distance corresponding to the level; and controlling the target virtual object to move from a current position to a target position along the first direction according to the target distance.

11. The electronic device according to claim 10, wherein the method further comprises:

rendering a skill release mode setting interface of the composite skill control, the skill release mode setting interface including a first release mode and a second release mode;

when a selection operation for the first release mode is received, controlling the composite skill control to trigger the first skill release instruction by releasing a drag operation of the composite skill control; and when a selection operation for the second release mode is received, controlling the composite skill control to trigger the first skill release instruction by dragging the composite skill control by a target distance.

12. The electronic device according to claim 10, wherein the method further comprises:

rendering a mobile control, the mobile control being configured to control a motion direction of the target virtual object;

determining a second direction in response to a second direction adjustment instruction triggered on the mobile control; and controlling the target virtual object to release the motion skill along the second direction in response to a second skill release instruction triggered on the skill control.

13. The electronic device according to claim 10, wherein the method further comprises:

rendering a mobile control, the mobile control being configured to control a motion direction of the target virtual object;

receiving a fourth direction adjustment instruction triggered on the mobile control in the process of controlling the target virtual object to release the motion skill along the first direction; and controlling the target virtual object to maintain the release of the motion skill along the first direction when the first direction is inconsistent with a fourth direction indicated by the fourth direction adjustment instruction.

14. The electronic device according to claim 10, wherein the current property of the direction indication identification in the composite skill control is changed in response to a first direction adjustment instruction triggered on the composite skill control.

15. The electronic device according to claim 10, wherein the controlling the target virtual object to release the motion skill along a first direction comprises:

determining the first direction based on a mapping relationship between the current property of the direction indication identification in the composite skill control and a release direction of the motion skill; and controlling the target virtual object to release the motion skill along the first direction.

16. The electronic device according to claim 10, wherein the controlling the target virtual object to move from a current position to a target position along the first direction according to the target distance comprises:

performing obstacle detection on the target position to obtain a detection result;

when the detection result represents that no obstacle exists at the target position, controlling the target virtual object to move to the target position along the first direction according to the target distance; and when the detection result represents that an obstacle exists at the target position, controlling the target virtual object to move to other positions along the first direction according to a distance less than the target distance.

17. A non-transitory computer readable storage medium, storing an executable instruction thereon that, when executed by a processor of an electronic device, causes the electronic device to implement a control method of a virtual skill including:

rendering a skill control of a virtual scene, the skill control corresponding to a motion skill of a target virtual object;

rendering a composite skill control containing a direction indication identification when a trigger operation for the skill control is received; and controlling the target virtual object to release the motion skill along a first direction according to a current property of the direction indication identification in the composite skill control in response to a first skill release instruction triggered on the composite skill control, further comprising:

determining a level of the target virtual object and a target distance corresponding to the level; and controlling the target virtual object to move from a current position to a target position along the first direction according to the target distance.

18. The non-transitory computer readable storage medium according to claim 17, wherein the current property of the direction indication identification in the composite skill control is changed in response to a first direction adjustment instruction triggered on the composite skill control.

19. The non-transitory computer readable storage medium according to claim 17, wherein the controlling the target virtual object to release the motion skill along a first direction comprises:

determining the first direction based on a mapping relationship between the current property of the direction indication identification in the composite skill control and a release direction of the motion skill; and controlling the target virtual object to release the motion skill along the first direction.

20. The non-transitory computer readable storage medium according to claim 17, wherein the controlling the target virtual object to move from a current position to a target position along the first direction according to the target distance comprises:

performing obstacle detection on the target position to obtain a detection result;

when the detection result represents that no obstacle exists at the target position, controlling the target virtual object to move to the target position along the first direction according to the target distance; and when the detection result represents that an obstacle exists at the target position, controlling the target virtual object to move to other positions along the first direction according to a distance less than the target distance.

* * * * *